(12) United States Patent
Wittig

(10) Patent No.: US 6,760,076 B2
(45) Date of Patent: Jul. 6, 2004

(54) SYSTEM AND METHOD OF SYNCHRONIZATION RECOVERY IN THE PRESENCE OF PILOT CARRIER PHASE ROTATION FOR AN ATSC-HDTV RECEIVER

(75) Inventor: Karl R. Wittig, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 537 days.

(21) Appl. No.: 09/732,583

(22) Filed: Dec. 8, 2000

(65) Prior Publication Data

US 2002/0071053 A1 Jun. 13, 2002

(51) Int. Cl.⁷ .................................................. H04N 5/04
(52) U.S. Cl. ..................... 348/500; 348/507; 348/508; 375/326; 375/327
(58) Field of Search ......................... 348/500, 507, 348/508, 516, 521, 524, 527, 528, 532, 533, 536, 537; 375/326, 327, 270, 321; H04N 9/44, 9/45, 9/455, 5/06

(56) References Cited

U.S. PATENT DOCUMENTS

| | | | | |
|---|---|---|---|---|
| 4,726,043 A | * | 2/1988 | Levesque | 375/343 |
| 5,956,369 A | * | 9/1999 | Davidovici et al. | 375/152 |
| 5,959,682 A | * | 9/1999 | Kim et al. | 348/511 |
| 6,002,728 A | * | 12/1999 | Blois et al. | 375/355 |
| 6,356,598 B1 | * | 3/2002 | Wang | 375/321 |
| 6,363,124 B1 | * | 3/2002 | Cochran | 375/326 |
| 6,505,220 B1 | * | 1/2003 | Ikeda | 708/212 |

FOREIGN PATENT DOCUMENTS

GB  2320871  7/1998  ......... H04L/27/26

* cited by examiner

Primary Examiner—Michael H. Lee
Assistant Examiner—Trang U. Tran

(57) ABSTRACT

There is disclosed a system and method for recovering a recurring data segment synchronization pattern in the presence of an arbitrary phase rotation of a pilot carrier by detecting and compensating for the amount of the phase rotation. The system comprises a first synchronization pattern detector capable of receiving a real component of a complex signal and detecting a data segment synchronization pattern on the real component, and a second synchronization pattern detector capable of receiving an imaginary component of a complex signal and detecting a data segment synchronization pattern on the imaginary component. There is also disclosed a method for compensating a pilot carrier phase rotation comprising the steps of determining the angle of pilot carrier phase rotation present in a complex signal and rotating the pilot carrier signal through the same angle in the opposite direction. Methods are also disclosed for compensating signal gain in a complex signal in which pilot carrier phase rotation has occurred.

14 Claims, 6 Drawing Sheets

SYSTEM AND METHOD OF SYNCHRONIZATION RECOVERY IN THE PRESENCE OF PILOT CARRIER PHASE ROTATION FOR AN ATSC-HDTV RECEIVER

TECHNICAL FIELD OF THE INVENTION

The present invention is directed, in general, to the reception of high definition television signals and, more specifically, to a system and method for recovering a recurring data segment synchronization pattern in the presence of an arbitrary phase rotation of the pilot carrier by detecting and compensating for the amount of the phase rotation.

BACKGROUND OF THE INVENTION

The Advanced Television Systems Committee (ATSC) standard for digital high definition television (HDTV) transmission uses a signal that is modulated as an eight (8) level vestigial sideband (VSB) symbol stream with a rate of 10.76 MHz. The ATSC standard defines a data segment as a length of data having eight hundred thirty two (832) symbols. Each data segment begins with a fixed pattern comprising the four symbols "1001". The fixed pattern of "1001" indicates the start of a new data segment. The "1001" symbols are the first four symbols of the 832 symbols in the data segment.

In the demodulation process, the fixed pattern "1001" is used by the receiver to determine the positional alignment of the data segment. Locating (or "recovering") the positional alignment of the data segment is essential for data frame synchronization and for facilitating symbol timing recovery. Consequently, reliable and robust detection of the recurring four symbol "1001" pattern is essential to the operation of any receiver that receives signals that are broadcast according to the ATSC standard.

The baseband signal to be demodulated includes a pilot carrier located exactly at DC on the frequency spectrum. Under normal conditions, the pilot carrier is at the same phase angle (or very near the same phase angle) as the remainder of the signal spectrum. Under these normal conditions, any of a number of well known techniques may be used to recover the data segment synchronization pattern.

If, however, the channel introduces severe phase distortion over the signal spectrum so that the pilot carrier is at a very different phase angle from the remainder of the signal spectrum, then the recovery of the data segment synchronization pattern using standard methods will become much more difficult or even impossible. Severe phase distortions can arise, for example, in a channel where there is a very strong multipath with a very short delay on the order of one symbol period or less.

Under normal conditions in a terrestrial data transmission system, a conventional channel equalizer is used to compensate for channel distortion and multipath. Under conditions of severe phase distortion, a complex channel equalizer operated in a "blind" adaptation mode can be used to compensate for channel effects before the data segment synchronization recovery is performed. Although the length of the complex channel equalizer is not very long (on the order of ten (10) to twenty (20) data taps), the complex channel equalizer nevertheless constitutes a substantial hardware component of a demodulator system.

Because a complex channel equalizer performs a two-dimensional complex equalization (as opposed to a conventional equalizer that performs real, or one-dimensional, equalization), a complex channel equalizer can become susceptible to instability in the presence of certain nonlinearities in a complex input signal. Under such conditions, recovery of a data segment synchronization pattern using a complex channel equalizer can be very difficult or even impossible.

There is therefore a need in the art for an improved system and method of recovering a recurring data segment synchronization pattern in the presence of an arbitrary phase rotation of a pilot carrier in an ATSC broadcast signal. There is also a need in the art for an improved system and method that can recover a recurring data segment synchronization pattern without using a complex channel equalizer. There is also a need in the art for an improved system and method that can compensate a baseband signal for an arbitrary phase rotation of a pilot carrier.

SUMMARY OF THE INVENTION

To address the above-discussed deficiencies of the prior art, it is a primary object of the present invention to provide an improved system and method of recovering a recurring data segment synchronization pattern in the presence of an arbitrary phase rotation of a pilot carrier in a terrestrial HDTV broadcast signal encoded according to the ATSC standard.

Under specified channel conditions, the present invention allows the data segment synchronization pattern to be detected before the signal is compensated for the phase rotation of the pilot carrier. The present invention compensates for the phase rotation of the pilot carrier prior to the channel equalization and subsequent forward error correction of the signal.

The present invention comprises a first synchronization pattern detector for detecting a data segment synchronization pattern on the real component of the signal and a second synchronization pattern detector for detecting a data segment synchronization pattern on the imaginary component of the signal. This arrangement permits the present invention to detect the data segment synchronization pattern on a signal whose pilot carrier has been rotated by an arbitrary phase angle.

The present invention also comprises circuitry for compensating for the phase rotation of the pilot carrier. The present invention also comprises circuitry for compensating for distortions in signal gain that may occur when pilot carrier experiences phase rotation.

It is a primary object of the present invention to provide an improved system and method for recovering a recurring data segment synchronization pattern in the presence of an arbitrary phase rotation of a pilot carrier.

It is an additional object of the present invention to provide an improved system and method that can recover a recurring data segment synchronization pattern without using a complex channel equalizer.

It is another object of the present invention to provide an improved system and method for compensating for an arbitrary phase rotation of a pilot carrier.

It is still another object of the present invention to provide an improved system and method for compensating for signal gain in a signal in which pilot carrier phase rotation has occurred.

It is yet another object of the present invention to provide an improved feedforward system and method for compensating for pilot carrier phase rotation and signal gain.

It is also another object of the present invention to provide an improved feedback system and method for compensating for pilot carrier phase rotation and signal gain.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged receiver for receiving an HDTV broadcast signal encoded according to the ATSC standard.

Figure 1A:
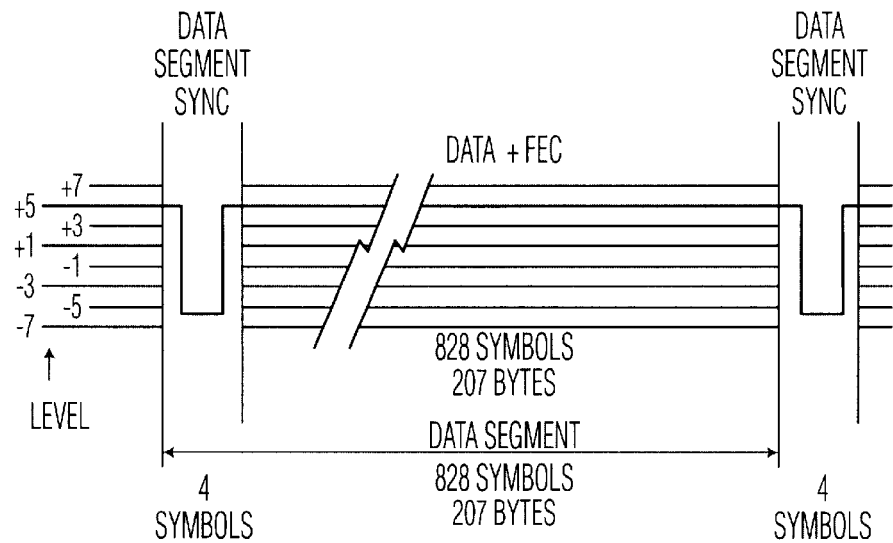
FIG. 1A illustrates an ATSC data segment structure.

One of the procedures that must be performed for the successful reception of HDTV ATSC signals is the recovery of the recurring four symbol data segment synchronization pattern. As previously described, this pattern consists of a fixed sequence of the symbols "1001". The symbols "1001" represent binary digits represented by two of the eight symbol values used in the 8VSB modulation scheme. For example, the symbol "1" may be represented by the +5 level and the symbol "0" may be represented by the −5 level of the 8VSB levels. The data segment structure specified by the ATSC standard is shown in FIG. 1A. Each data segment may contain data and/or forward error correction (FEC) information.

The "1001" sequence is repeated every eight hundred thirty two (832) data symbols. The "1001" sequence serves to indicate the start of a new data segment. Each data segment consists of the four (4) data segment synchronization symbols "1001" and the eight hundred twenty eight (828) data symbols that make up the rest of the data segment.

Figure 1B:
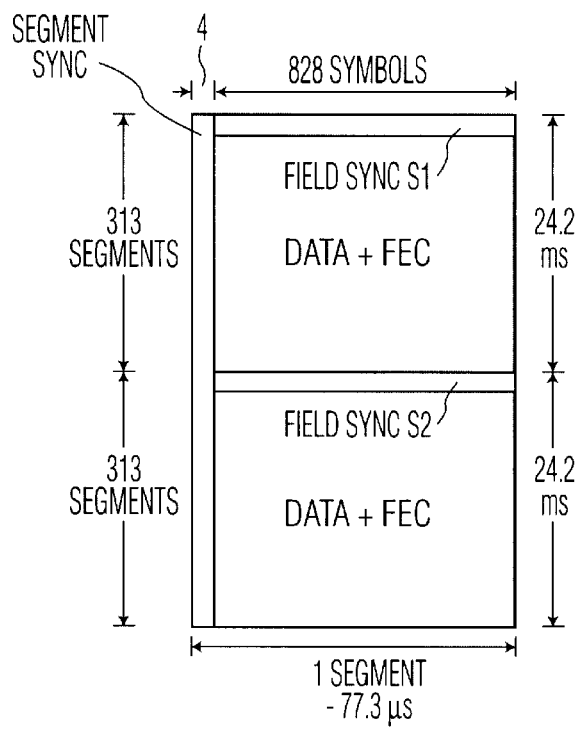
FIG. 1B illustrates an ATSC data frame structure.

A symbol data frame is also defined in the ATSC standard. A symbol data frame consists of three hundred thirteen (313) data segments. The first data segment in the data frame is a data segment called Data Field Sync. The Data Field Sync segment contains a specified pseudorandom bit sequence that is used for data field synchronization. The remaining three hundred twelve (312) data segments contain symbol data and/or forward error correction (FEC) information. The symbol data frame structure specified by the ATSC standard is shown in FIG. 1B.

Figure 2:
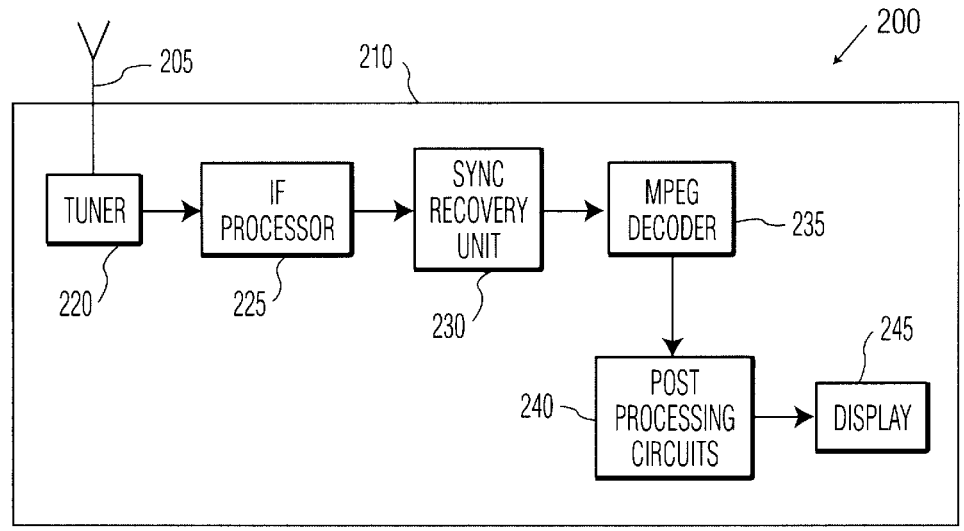
FIG. 2 illustrates a block diagram of a television receiver capable of receiving an ATSC broadcast signal comprising a synchronization recovery unit of the present invention.

FIG. 2 illustrates a block diagram of television 200 that is capable of receiving an ATSC broadcast signal. Television 200 comprises receiver 210 coupled to receiving antenna 205. Tuner 220 of receiver 210 receives ATSC broadcast signals from receiving antenna 205. Intermediate frequency (IF) processor 225 is coupled to tuner 220 and receives signals from tuner 220. Synchronization recovery unit 230 of the present invention is coupled to IF processor 225. As will be more fully explained, synchronization recovery unit 230 recovers the data segment synchronization pattern in the presence of pilot carrier phase rotation. The remainder of the elements of receiver 210 are well known conventional elements. They generally comprise MPEG decoder 235, post processing circuits 240 and display unit 245.

In order for an incoming vestigial sideband (VSB) signal to be compensated for phase rotation of the pilot carrier, the VSB signal must be represented as a complex signal. As is well known, a complex signal has both a real component and an imaginary component. It is known that the imaginary component of a complex signal can be generated by using a Hilbert filter on the real component of the complex signal. For example, if the pilot carrier is recovered by using analog methods so that the resulting demodulated baseband signal has only a real component, then the imaginary component may be recovered by using a Hilbert filter on the real component. However, the preferred approach for recovering the pilot carrier uses purely digital methods that can generate both the real component and the imaginary component of the baseband signal.

Figure 3:
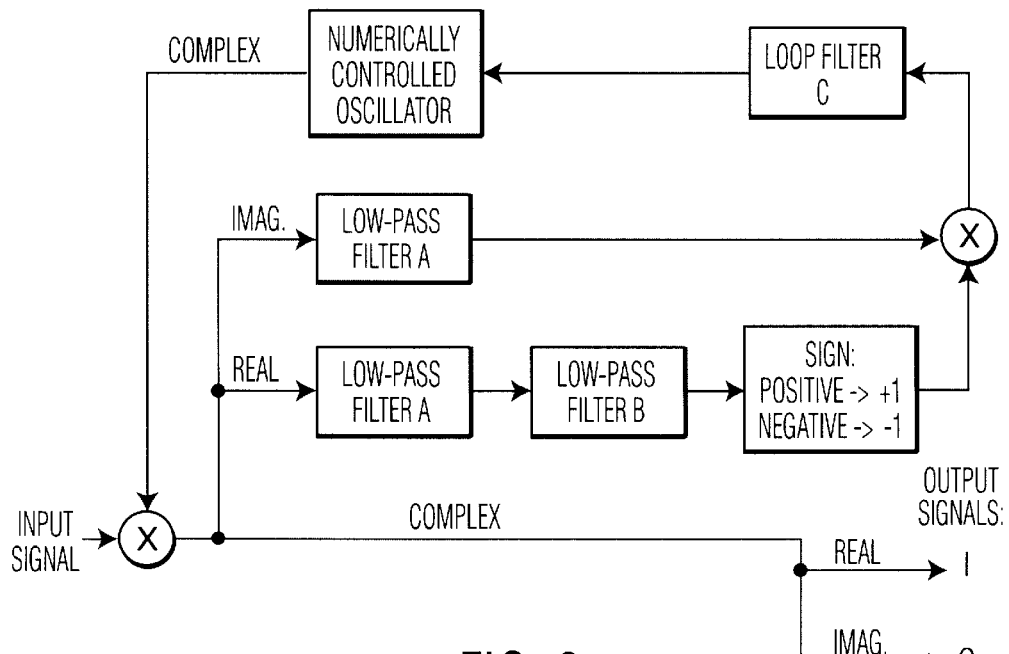
FIG. 3 illustrates a prior art method of recovering the pilot carrier that generates a complex signal.

One well known prior art method for recovering the pilot carrier is the Costas Loop method illustrated in FIG. 3. The real component and the imaginary component of the input signal are each filtered using a Nyquist, or square-root raised-cosine (SQRC) filter having characteristics that are specified by the ATSC standard. After the filtering is completed, the DC baseband signal offset that corresponds to the pilot carrier is removed using well known prior art methods. This must always be done for the real component of the signal. In the absence of rotation of the pilot carrier, the imaginary component does not have a DC offset. However, a DC offset can be present in the imaginary component if the method for recovering the pilot carrier does not guarantee that the imaginary component has zero DC offset. Some methods for recovering the pilot carrier insure that the imaginary component has a zero DC offset. In any case, if a DC offset is present in the imaginary component, then the DC offset must be removed.

Figure 4:
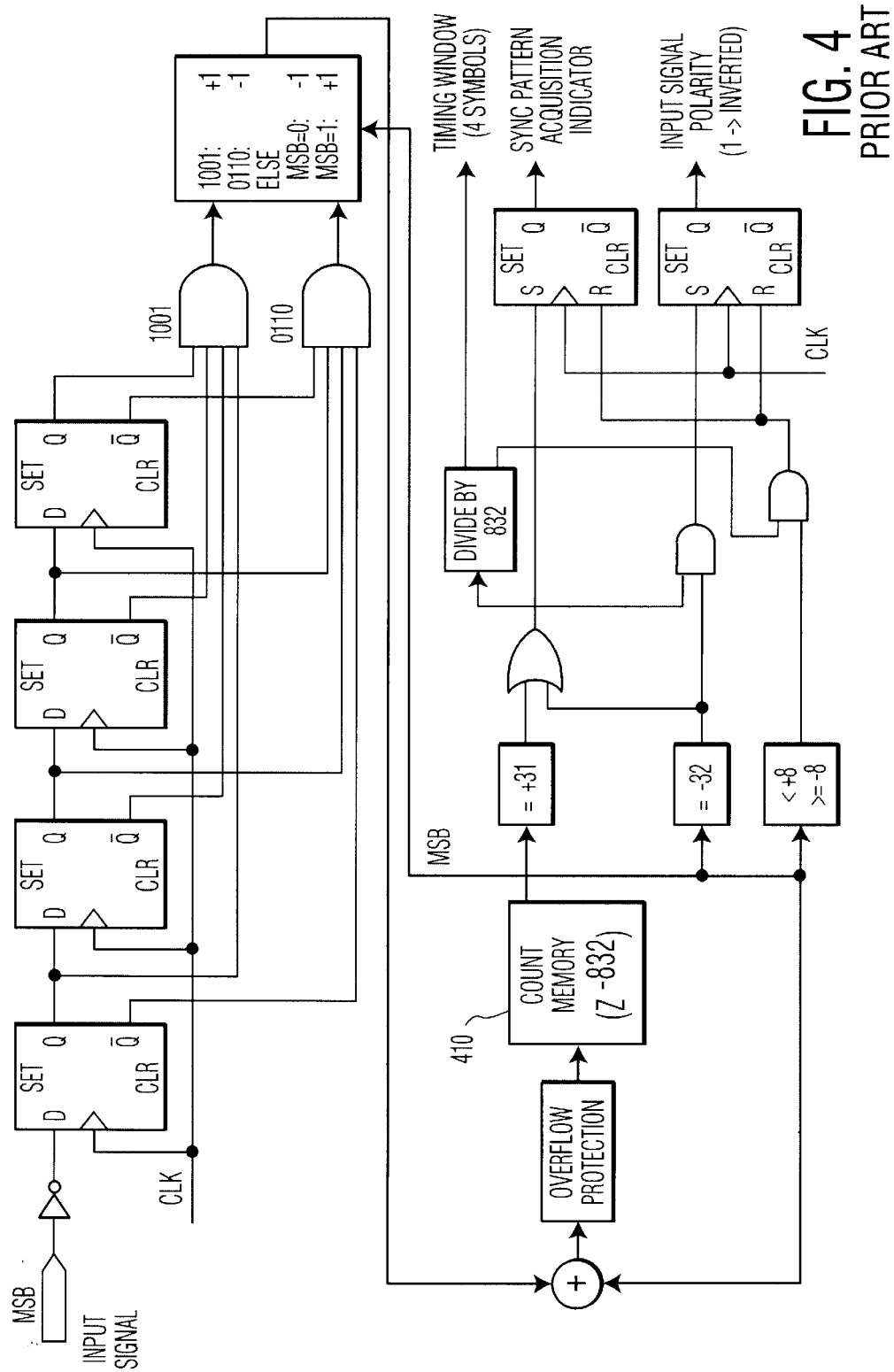
FIG. 4 illustrates a prior art method of recovering a data segment synchronization pattern.

In the case of a real baseband VSB signal, the data segment synchronization pattern "1001" can be detected using any one of a number of prior art methods. One particularly simple method is illustrated in FIG. 4. In this method, only the sign bit (i.e., the most significant bit (MSB)) of the digital baseband signal is examined for every symbol. The four most recently received symbols are compared to the fixed "1001" symbol pattern.

A comparison is made for all eight hundred thirty two (832) possible data segment alignment positions. Count memory 410 contains a plurality of memory locations (not shown) in which each memory location contains a count value for each alignment position. Count memory 410 records the current count value for each alignment position. In the case of the alignment position currently being evaluated, if the most recently received four symbols have the specified fixed pattern ("1001"), then the count value for that position is incremented. If not, the count value is decremented. If a valid VSB signal is present, then the count value for one of the 832 positions will reach its maximum value, while those for the remaining 831 positions will be at or near the minimum value. The alignment of the data segment is immediately established by locating the position that has the maximum count value.

This method will always work for a VSB signal of acceptable quality (i.e., a VSB signal with a signal-to-noise ratio above a specified value) in which the pilot carrier phase has not been rotated relative to the signal. A number of different methods exist for detecting the data segment synchronization pattern "1001" (e.g., autocorrelation of the data symbol stream). The method illustrated in FIG. 4 is given only as an example.

If the pilot carrier phase has been rotated, however, the method illustrated in FIG. 4 is not guaranteed to work. In particular, if the pilot carrier is rotated by ninety degrees (90°), the data symbol stream will be completely absent from the real component of the signal. Then the receiver will detect nothing even in the presence of an otherwise valid, high-quality signal.

In those cases where the pilot carrier has been rotated by ninety degrees (90°), the full data symbol stream will be present in the imaginary component of the signal. Detection of the data segment synchronization pattern can therefore be guaranteed by using a second synchronization detector on the imaginary component of the signal.

Figure 5:
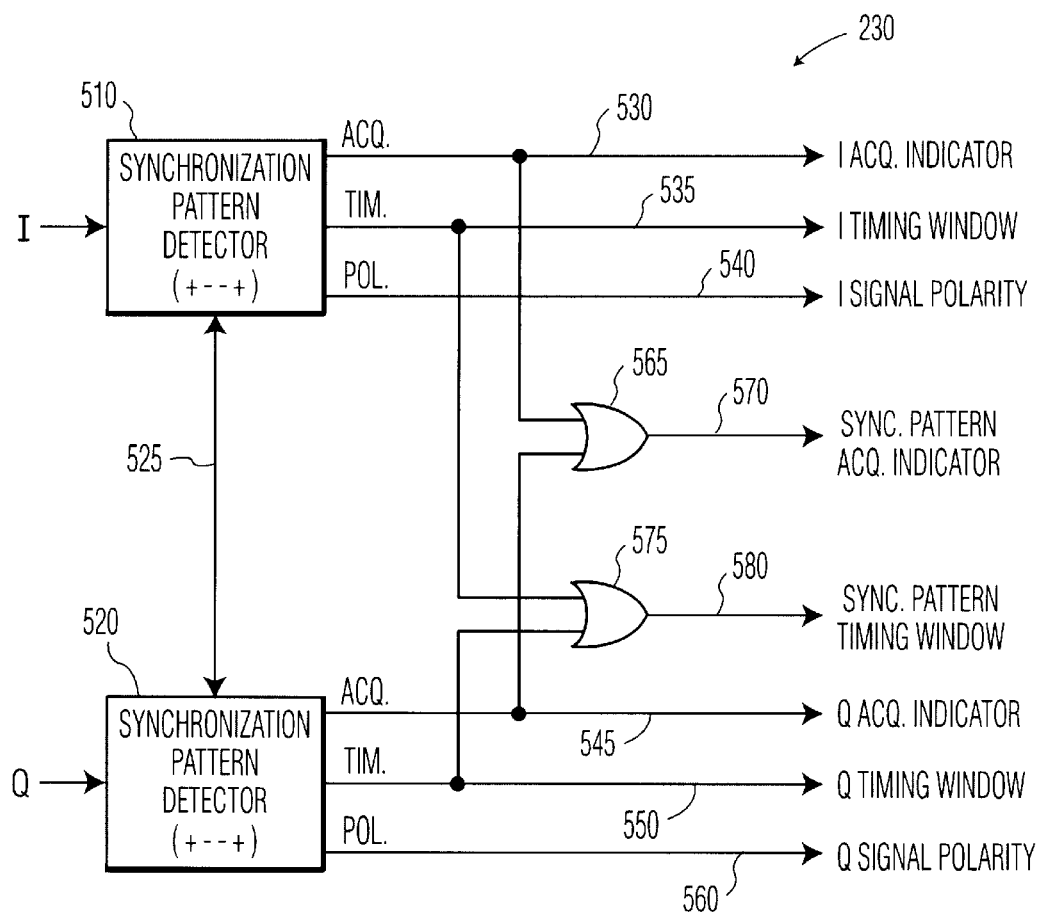
FIG. 5 illustrates an advantageous embodiment of the present invention for recovering a data segment synchronization pattern.

An advantageous embodiment of synchronization recovery unit 230 of the present invention is illustrated in FIG. 5. Synchronization recovery unit 230 comprises first synchronization pattern detector 510 and second synchronization pattern detector 520 coupled in parallel. First synchronization pattern detector receives the real component of the signal as an in-phase ("I") input. Second synchronization pattern detector 520 receives the imaginary component of the signal as a quadrature ("Q") input. The operations of first synchronization pattern detector 510 and second synchronization pattern detector 520 must be mutually coordinated in order to insure that the synchronization patterns are simultaneously acquired with the same symbol position in both of the detectors 510 and 520. The necessary mutual coordination is accomplished by coordinating signals sent via signal line 525. In an advantageous embodiment of the present invention, first synchronization pattern detector 510 and second synchronization pattern detector 520 each comprise a synchronization pattern detector of the type shown in FIG. 4 modified as described more fully below.

Using second synchronization pattern detector 520 for the imaginary component of the signal insures that the data segment synchronization pattern will be successfully detected for all phase rotation values of the pilot carrier between zero degrees (0°) and ninety degrees (9°). Both first synchronization pattern detector 510 for the real component of the signal and second synchronization pattern detector 520 for the imaginary component of the signal are capable of detecting the data segment synchronization pattern in any signal having a phase rotation of forty five degrees (45°) or less.

If the phase rotation of the pilot carrier is not within the range of values between zero degrees (0°) and ninety degrees (90°), then the polarity of the data symbol stream will be inverted on at least one of the two signal components. Specifically, the polarity of the data symbol stream will be inverted either 1) on the real component, or 2) on the imaginary component, or 3) on both the real component and the imaginary component. As a consequence, in a similar manner, the data segment synchronization pattern will also be inverted on at least one of the two signal components.

The method described above can be used to detect the data segment synchronization pattern throughout the entire three hundred sixty degree (360°) range of possible pilot carrier rotations. This may be done if first synchronization pattern detector 510 and second synchronization pattern detector 520 are both capable of detecting both the fixed symbol pattern ("1001") and the complementary, or inverted, pattern ("0110") that appears when the signal polarity is inverted.

This may be accomplished by using the synchronization detector illustrated in FIG. 4 to increment and decrement the count value as follows. The count value for the current alignment position is incremented if, for that alignment position, the most recently received four symbols have the fixed symbol pattern ("1001"). If the most recently received four symbols have the complementary pattern ("0110"), then the count value is decremented. If the most recently received four symbols have neither pattern, then the count value is decremented towards zero (i.e., the count value is decremented if the count value is positive and the count value is incremented if the count value is negative).

If either the maximum count value or the minimum count value is reached, then both the alignment of the data segment and the polarity of the signal component are determined. Specifically, if the maximum count is reached, then the alignment position that has the maximum count value establishes the alignment of the data segment. The maximum count corresponds to a noninverted signal with a noninverted signal polarity. Similarly, if the minimum count is reached, then the alignment position that has the minimum count value establishes the alignment of the data segment.

The minimum count corresponds to an inverted signal with an inverted signal polarity.

The output of first synchronization pattern detector 510 comprises an I ACQ INDICATOR signal on signal line 530 and an I TIMING WINDOW signal on signal line 535 and an I SIGNAL POLARITY signal on signal line 540. When the I ACQ INDICATOR signal has the value "one", then the data segment synchronization pattern has been detected on the real component of the signal. The I TIMING WINDOW signal contains the location of the data segment synchronization pattern located on the real component of the signal. When the I SIGNAL POLARITY signal has the value "zero", then the real component of the signal is noninverted.

Similarly, the output of second synchronization pattern detector 520 comprises a Q ACQ INDICATOR signal on signal line 545 and a Q TIMING WINDOW signal on signal line 550 and an Q SIGNAL POLARITY signal on signal line 560. When the Q ACQ INDICATOR signal has the value "one", then the data segment synchronization pattern has been detected on the imaginary component of the signal. The Q TIMING WINDOW signal contains the location of the data segment synchronization pattern located on the imaginary component of the signal. When the Q SIGNAL POLARITY signal has the value "zero", then the imaginary component of the signal is noninverted.

The I ACQ INDICATOR output from signal line 530 and the Q ACQ INDICATOR output on signal line 545 are both coupled to logical OR 565. The output of logical OR 565 is a SYNCHRONIZATION PATTERN ACQUISITION INDICATOR signal on signal line 570. When the SYNCHRONIZATION PATTERN ACQUISITION INDICATOR signal has the value "one", then the data segment synchronization pattern has been detected on either the real component of the signal or on the imaginary component of the signal.

The I TIMING WINDOW output from signal line 535 and the Q TIMING WINDOW output on signal line 550 are both coupled to logical OR 575. The output of logical OR 575 is a SYNCHRONIZATION PATTERN TIMING WINDOW signal on signal line 580. The SYNCHRONIZATION PATTERN TIMING WINDOW signal contains the location of the data segment synchronization pattern located on either the real component of the signal or on the imaginary component of the signal.

FIG. 5 illustrates a synchronization recovery unit 230 that is capable of carrying out the above described method for recovering a data segment synchronization pattern in signals that have either noninverted polarity or that have inverted polarity. The method of detecting a data segment synchronization pattern on either the real component or the imaginary component of signals that have arbitrary polarities enables the detection of the data segment synchronization pattern in a signal whose pilot carrier is rotated by any arbitrary phase angle.

The exemplary system and method for detecting a data segment synchronization pattern that is set forth and described above is illustrative only. The description of this system and method is not meant to suggest that it is the only system and method of detection that may be used in conjunction with first synchronization pattern detector 510 and second synchronization pattern detector 520 of the present invention.

Some pilot carrier recovery methods have an inherent one hundred eighty degree (180°) phase ambiguity that must be taken into account and that can sometimes cause difficulties. An additional benefit of the method of the present invention is that this phase ambiguity is eliminated because the signal polarity is now determined by using first synchronization pattern detector 510 and second synchronization pattern detector 520.

One possible limitation in the method described above is that more than one matching alignment position may be detected by synchronization recovery unit 230 if very strong multipaths are present. The detection of more than one matching alignment position naturally raises the question of which alignment corresponds to the original signal and which alignment corresponds to the multipath signal. The ambiguity can be eliminated by making two simplifying assumptions that are generally true in all practical circumstances.

The first assumption is that there are no "pre-echoes." That is, there are no multipath interference signals that arrive before the actual signal arrives. Although the possibility of such pre-echoes may exist in cable television systems, the existence of pre-echoes should not be a concern in a terrestrial broadcast system. This is due to the fact that the actual signal travels on a direct line between the transmitting antenna and the receiving antenna. The multipath signal is reflected and travels a longer distance than the actual signal. The multipath signal therefore arrives at a later time than the actual signal.

The second assumption is that the maximum delay of a very strong multipath signal is less than half the length of a data segment interval. Given that both of these assumptions are correct, then when the data segment synchronization pattern is detected at more than one symbol position, the actual signal corresponds to the first such position within any interval of half of a symbol data segment in duration for which more than one pattern was detected. It is essential that this first position be determined by considering all patterns detected by both first synchronization pattern detector 510 and second synchronization pattern detector 520 in conjunction within the specified interval.

After the data segment synchronization pattern alignment position has been determined for an incoming signal whose pilot carrier phase has been rotated, it is then necessary to compensate for the phase rotation before further processing the signal. The effect of the pilot carrier phase rotation must be removed before the signal is subjected to channel equalization, forward error correction, and other types of signal processing.

Figure 6:
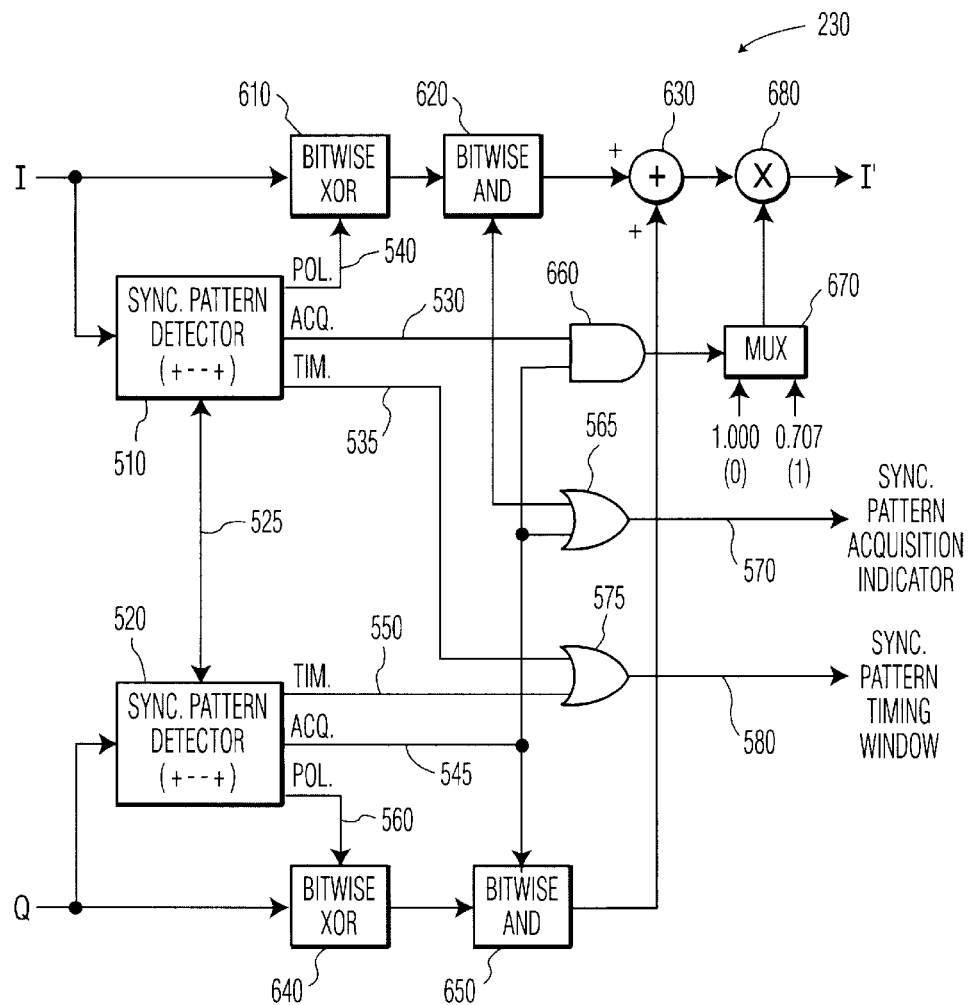
FIG. 6 illustrates an advantageous embodiment of the present invention for compensating for pilot carrier phase rotation.

An advantageous embodiment of synchronization recovery unit 230 using an advantageous method of performing the compensation process is shown in FIG. 6. Since both first synchronization pattern detector 510 and second synchronization pattern detector 520 can determine the polarity of the signal, the value of the phase rotation angle of the pilot carrier can be identified to within the nearest forty five degrees (45°) by specifying one of eight sections of a plane (or "octants") within which (or very near to which) the actual phase rotation angle lies. If only first synchronization pattern detector 510 for the real component of the signal detects a data segment synchronization pattern, then the value of the phase rotation will be near zero degrees (0°) or near one hundred eighty degrees (180°), depending upon the signal polarity identified by first synchronization pattern detector 510. If only second synchronization pattern detector 520 for the imaginary component of the signal detects a data segment synchronization pattern, then the value of the phase rotation will be near ninety degrees (90°) or near two hundred seventy (270°) degrees, depending upon the signal polarity identified by second synchronization pattern detector 520.

If, however, first synchronization pattern detector 510 and second synchronization pattern detector 520 both detect a data segment synchronization pattern, then the value of the phase rotation is a value that lies at a forty five degree (45°) angle from the angles determined by the polarity indicators of first synchronization pattern detector 510 and second synchronization pattern detector 520. For example, assume that first synchronization pattern detector 510 detects an I SIGNAL POLARITY signal with the value "one" indicating that the real component of the signal is inverted. Further assume that second synchronization pattern detector 520 detects a Q SIGNAL POLARITY signal with the value "one" indicating that the imaginary component of the signal is inverted. This means that the value of the phase rotation is between one hundred eighty degrees (180°) and two hundred seventy (270°) degrees.

If first synchronization pattern detector 510 and second synchronization pattern detector 520 are designed to detect the data segment synchronization pattern in signals where the phase is rotated by less than sixty degrees (60°), this method will determine the phase rotation to the nearest multiple of forty five degrees (45°). The desired phase rotation compensation is then performed by 1) selecting the component or components that contain the symbol data, and, 2) compensating for the respective signal polarities, and 3) if symbol data is present on both the real component and the imaginary component, adding the signal components after the compensation for polarity, and 4) multiplying the result by the constant 0.707 which is equal to the sine (or cosine) of forty five degrees (45°).

The I signal with the real component is coupled to bitwise logical XOR 610. The I SIGNAL POLARITY on signal line 540 is also coupled to bitwise logical XOR 610 to compensate the I signal for the polarity determined by first synchronization pattern detector 510. The result is coupled to bitwise logical AND 620. The I ACQUISITION INDICATOR signal on signal line 530 is also coupled to bitwise logical AND 620 to select the I component if it contains the symbol data. The result is transferred to adder 630.

Similarly, the Q signal with the imaginary component is coupled to bitwise logical XOR 640. The Q SIGNAL POLARITY on signal line 560 is also coupled to bitwise logical XOR 640 to compensate the Q signal for the polarity determined by second synchronization pattern detector 520. The result is coupled to bitwise logical AND 650. The Q ACQUISITION INDICATOR signal on signal line 545 is also coupled to bitwise logical AND 650 to select the Q component if it contains the symbol data. The result is transferred to adder 630 where the I and Q signal components are added.

The I ACQUISITION INDICATOR signal on signal line 530 and the Q ACQUISITION INDICATOR signal on signal line 545 are coupled to logical AND 660. If symbol data is present on both the I component and the Q component, then logical AND 660 will send a "one" signal to multiplexer 670. Multiplexer 670 will then cause the output of adder 630 to be multiplied by the constant 0.707 in multiplier 680. If logical AND 660 sends a "zero" signal to multiplexer 670, symbol data is present on only one component, and the output of adder 630 is multiplied by unity in multiplier 680 and is unchanged.

Any remaining carrier phase rotation compensation that needs to be performed will now be for a much smaller angle. Carrier phase rotation compensation for a small angle can be performed by the channel equalizer using well known methods.

There are two disadvantages with the method described above. The first disadvantage is that the method does not compensate for the precise angle of the phase rotation. The second disadvantage is that the method cannot track the phase rotation angle for a dynamically varying signal in which the phase rotation angle is changing with time. In particular, if the phase rotation angle migrates from a first octant into a second octant, the resulting "jump" or discontinuity in the compensated signal can cause a severe disruption in the subsequent signal processing. The occurrence of a severe disruption may result in the loss of data. Although the risk of data loss can be eliminated by not allowing the compensation angle to change after the location of the data segment synchronization pattern has been determined, the two disadvantages of the method still remain.

An advantageous method of compensating for the pilot carrier phase rotation comprises the steps of 1) determining the angle of pilot carrier phase rotation introduced during transmission, and 2) compensating for the rotation of the pilot carrier signal by rotating the pilot carrier signal through exactly the same angle in the opposite direction. In order to do this, the amplitudes (i.e., the absolute values) of the symbol levels in the data segment synchronization pattern are determined for both the real component and the imaginary component of the signal. It is noted that 1) the exact arrival time of the symbol levels in the data segment synchronization pattern is determined by the synchronization pattern detectors, 510 and 520, and 2) the amplitudes of the symbol levels in the data segment synchronization pattern are the same for both binary values (0 and 1) and only the polarities are different, and 3) the data segment synchronization pattern is exactly known. In view of these three factors, the respective amplitudes of the real component and the imaginary component of the symbol levels in the data segment synchronization pattern give a measure of the pilot carrier phase rotation angle that can be used to compensate the signal.

The amplitude is determined for each component by taking either 1) the sum of the absolute values of the symbol levels of the four symbols in the data segment synchronization pattern or 2) the correlation with the pattern, and then either averaging or low-pass filtering the result over successive data segment synchronization patterns.

The relative values of the results for the two components corresponds directly to the angle of the phase rotation. Specifically, the ratio of the result for the imaginary component to the result for the real component equals the tangent of the desired compensation angle. If the complex signal is rotated by this angle in the opposite phase direction, then the resulting signal will be compensated for the phase rotation of the pilot carrier.

In addition to compensating the received signal for whatever phase rotation the signal may have undergone during transmission, it is also desirable to adjust the signal gain so that the amplitudes of the symbol levels correspond to standard specified values before further signal processing takes place. Because these values are as well defined for the four symbols in the data segment synchronization pattern as they are for any other symbols, the amplitude values that are determined for the two signal components can be used to perform the signal gain compensation in addition to being used to perform the phase rotation compensation.

To illustrate this concept, consider a complex signal with a real component I and an imaginary component Q that was modulated with symbol data only in the real component, and which was subsequently rotated by a phase angle during transmission. In order to compensate for this rotation and in order to retrieve the original one-component real signal I', the received complex signal must be rotated by the negative of the angle of phase rotation:

$$I'=I \cos(-\Theta)+Q \sin(-\Theta) \quad (1)$$

$$I'=I \cos(\Theta)-Q \sin(\Theta) \quad (2)$$

If the amplitudes of the signal components I and Q are determined by means of a correlation with the fixed data segment synchronization pattern, and then are either averaged or low-pass filtered over a number of data segments, the resulting steady-state amplitude values Is and Qs may be used to determine the angle of phase rotation. The imaginary component Q was not modulated with any symbol data. Consequently, Q should have zero amplitude. The real component I was modulated with all of the symbol data and should have the full amplitude. Therefore, I and Q respectively correspond to the cosine and sine of the phase angle:

$$\cos\Theta=Is/A \quad (3)$$

$$\sin\Theta=Qs/A \quad (4)$$

where A equals the square root of $[(Is)^2+(QS)^2]$.

Substituting these expressions into the previous expression for I' gives:

$$I'=(Is/A)I-(Qs/A)Q \quad (5)$$

$$I'=(1/A) [(Is)(I)-(Qs)(Q)] \quad (6)$$

Finally, the gain of the signal is compensated so that the resulting signal amplitude equals a specified value K. The amplitude of the received signal, independently of the phase rotation angle, is equal to the square root of $[(Is)^2+(Qs)^2]$.

$$\text{Amplitude}=[(Is)^2+(QS)^2]^{1/2}=A \quad (7)$$

The gain-compensated signal I" is then given by:

$$I''=(K/A)I' \quad (8)$$

$$I''=(K/A)(1/A)\cdot((Is)(I)-(Qs)(Q)) \quad (9)$$

$$I''=(K/[(Is)^2+(QS)^2])\cdot((Is)(I)-(Qs)(Q)) \quad (10)$$

Figure 7:
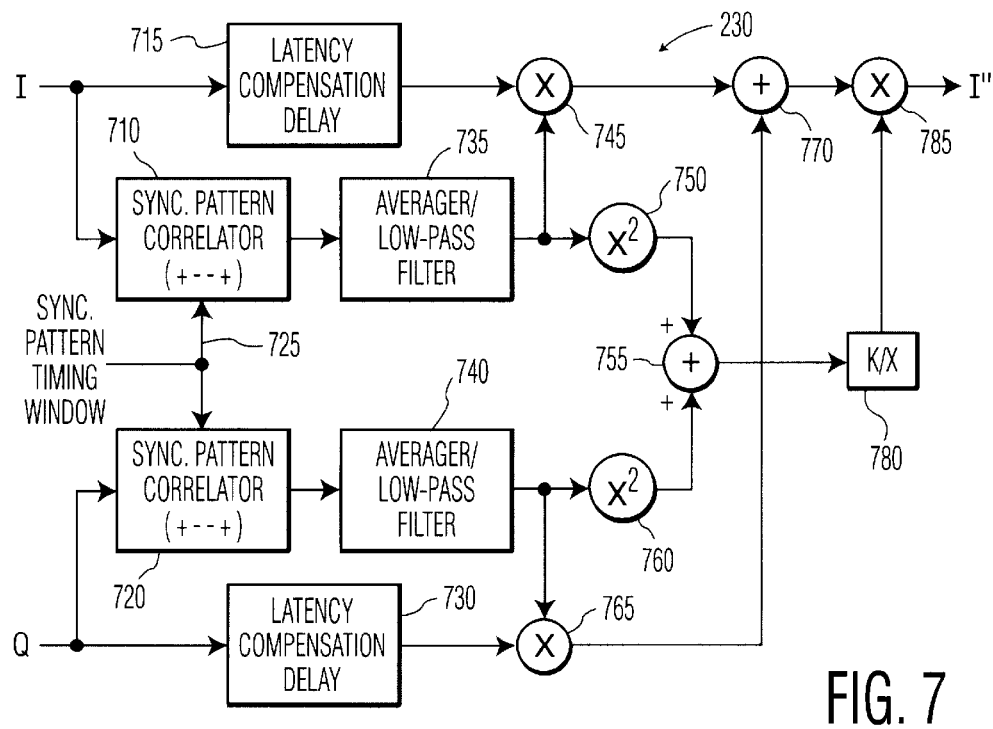
FIG. 7 illustrates an advantageous embodiment of the present invention using a feedforward method for compensating for pilot carrier phase rotation and signal gain.

An implementation of the compensation method described above that is capable of compensating for both the rotation of the pilot carrier phase angle and for signal gain is illustrated in FIG. 7. The advantageous embodiment of synchronization recovery unit 230 shown in FIG. 7 comprises first synchronization pattern correlator 710 and second synchronization pattern correlator 720 coupled in parallel. First synchronization pattern correlator 710 receives the real component of the signal as an in-phase ("I") input. Second synchronization pattern correlator 720 receives the imaginary component of the signal as a quadrature ("Q") input.

First and second synchronization pattern correlators, 710 and 720, may or may not operate in precisely the same manner as first and second synchronization pattern detectors, 510 and 520. A correlator performs the well known mathematical operation of the correlation of two signals. In the case of first synchronization pattern correlator 710, the input signal (i.e., the real component) comprises the first signal for correlation and the expected synchronization pattern comprises the second signal for correlation. In the case of second synchronization pattern correlator 720, the input signal (i.e., the imaginary component) comprises the first signal for correlation and the expected synchronization pattern comprises the second signal for correlation.

In each case, the expected synchronization pattern consists of the symbol sequence, +5, −5, −5, +5 (or the complementary or inverted symbol sequence, −5, +5, +5, −5) where the symbol level +5 represents "1" and the symbol level −5 represents "0" in the "1001" synchronization pattern (or in the "0110" synchronization pattern). The symbol levels +5 and −5 are the actual symbol levels that are expected (as shown in FIG. 1A).

Because the operation of correlation is a linear operation, one may equivalently use an expected synchronization pattern consisting of the symbol sequence, +1, −1, −1, +1 (or the complementary or inverted symbol sequence, −1, +1, +1, −1). This equivalence is indicated by showing the pattern (+ − − +) on the blocks depicting first sychronization pattern correlator 710 and second synchronization pattern correlator 720 in FIG. 7 and in FIG. 8.

In practice, the operation of correlation is implemented by 1) taking the value of the current input symbol data value (for either the real or the imaginary component), and 2) adding the negative of the previous value, and 3) adding the negative of the value prior to the previous value, and 4) adding the positive of the value prior to the value prior to the previous value.

When the input signal to the correlator (i.e., the first signal for correlation) corresponds to the expected synchronization pattern (i.e., the second signal for correlation), then the output of the correlator will be 1) the amplitude level corresponding to +5 in the input data if the input sequence is positive, and 2) the amplitude level corresponding to −5 in the input data if the input sequence is negative. The amplitude levels of the remaining symbol values (i.e., 1, 3, and 7) will be proportional to the amplitude level of the symbol value of 5.

Because the amplitude level of the arriving data in now known, it may be used to compensate the data to have the desired amplitude. The ratio of the imaginary amplitude to the real amplitude may be used to determine and compensate for the rotation of the phase angle.

The operations of first synchronization pattern correlator 710 and second synchronization pattern correlator 720 must be mutually coordinated in order to insure that the synchronization patterns are simultaneously acquired with the same symbol position in both of the correlators 710 and 720. The necessary mutual coordination is accomplished by coordinating signals sent via signal line 725.

First low pass filter 735 is coupled to the output of first synchronization pattern correlator 710. First low pass filter 735 is capable of determining an average steady state amplitude, Is, of the real component, I, of the complex signal. Similarly, second low pass filter 740 is coupled to the output of second synchronization pattern correlator 720. Second low pass filter 740 is capable of determining an average steady state amplitude, Qs, of the imaginary component, Q, of the complex signal.

First multiplier 745 multiplies the steady state amplitude of the real component, Is, by the amplitude of the real component, I, to obtain a first product. Latency compensation delay circuit 715 adds a time delay to the real component, I, to compensate for the time used to obtain the steady state amplitude of the real component, Is, with first synchronization pattern correlator 710 and first low pass filter 735.

Similarly, second multiplier 765 multiplies the steady state amplitude of the imaginary component, Qs, by the amplitude of the imaginary component, Q, to obtain a second product. Latency compensation delay circuit 730 adds a time delay to the imaginary component, Q, to compensate for the time used to obtain the steady state amplitude of the imaginary component, Qs, with second synchronization pattern correlator 720 and second low pass filter 740.

Subtraction circuit 770 subtracts the second product, (Qs) (Q), from the first product, (Is) (I), to form a subtraction result that is equal to ((Is) (I)–(Qs) (Q)). Multiplier 785 multiplies the subtraction result ((Is) (I)–(Qs) (Q)) from subtraction circuit 770 by a factor that is equal to an amplitude factor K divided by the sum of Is squared and Qs squared. The multiplication factor that is equal to $(K/[(Is)^2+(QS)^2])$ is provided to multiplier 785 by division circuit 780. Division circuit 780 obtains the sum of Is squared and Qs squared, $[(Is)^2+(QS)^2]$, from adder circuit 755. Adder circuit 755 obtains the square of Is from multiplier 750 that multiplies Is by Is. Adder circuit 755 also obtains the square of Qs from multiplier 760 that multiplies Qs by Qs.

It is generally a difficult and expensive operation to implement the mathematical operation of division in a high speed digital system. Therefore, the mathematical operation of division is avoided when possible. An alternative advantageous embodiment of the present invention for compensating for both the rotation of the pilot carrier phase angle and for signal gain without the need for using the division operation will now be described.

In the trigonometric representation of a complex signal, the phase angle and the amplitude may be regarded as two independent coordinates. The phase angle is determined by the ratio of the two signal components and the amplitude is determined by the sum of the squares of the two signal components. It can be seen from the expression for I" that is set forth above that the numerator depends strictly on the phase angle and the denominator depends strictly on the amplitude. This means that the denominator can be adjusted independently without affecting the rotation angle of the signal. This means that the need for a division operation may be eliminated.

The advantageous method comprises feeding the integral of the (negative) difference between the actual signal amplitude and the expected signal amplitude to control the signal gain. The steady-state amplitude of the output signal I" is obtained by 1) correlating the output signal with the data segment synchronization pattern, and 2) averaging or low-pass filtering the result, and 3) comparing the result of the averaging or filtering with the desired reference amplitude, and 4) integrating the negative difference, and 5) using the final result as the gain. When the value of the amplitude is greater than the desired value of amplitude, the difference integrated is negative, and the gain is gradually reduced, making the resulting signal (and therefore the difference) smaller in amplitude. When the value of the amplitude is less than the desired value of amplitude, the difference integrated is positive, and the gain is gradually increased, making the resulting signal (and therefore the difference) larger in amplitude. When the value of the amplitude equals the desired value of amplitude, the difference integrated is zero, so that the gain does not change.

Figure 8:
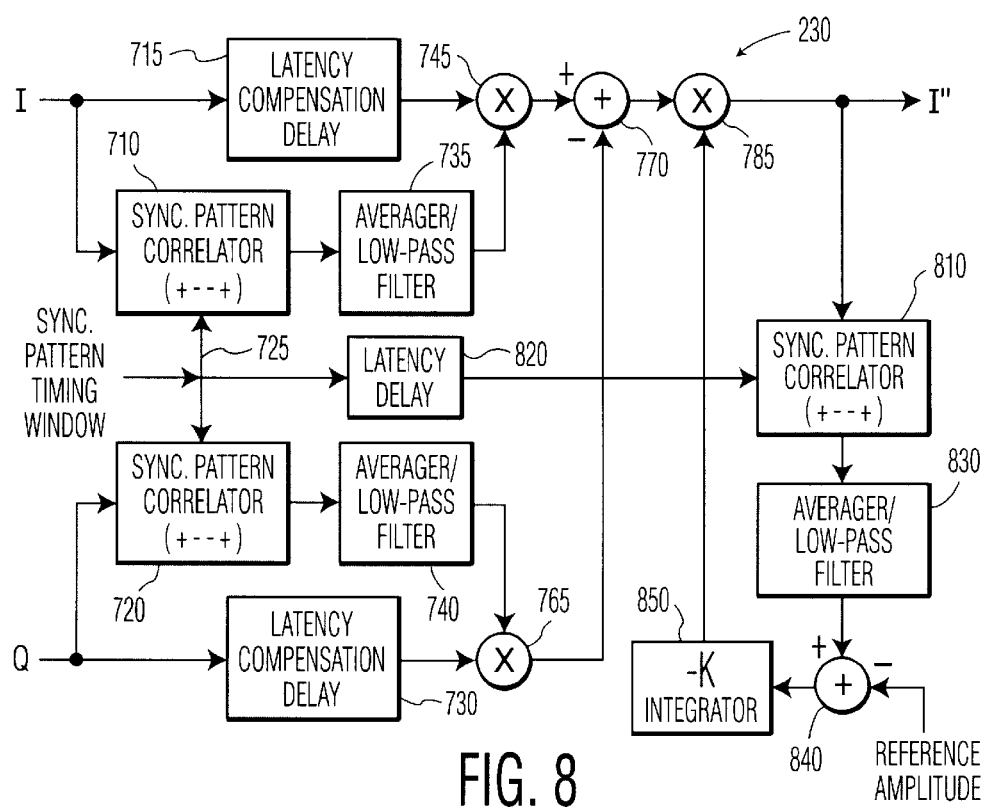
FIG. 8 illustrates an advantageous embodiment of the present invention using a feedback method for compensating for pilot carrier phase rotation and signal gain.

An implementation of this method for compensating for the phase rotation angle and the signal gain using feedback correction is shown in FIG. 8. Although the feedback method is not as stable as the feedforward implementation method illustrated in FIG. 7, the feedback method eliminates the need for an evaluation of the amplitude and eliminates the need for a division operation in the implementation.

The advantageous embodiment of synchronization recovery unit 230 shown in FIG. 8 comprises first synchronization pattern correlator 710 and second synchronization pattern correlator 720 coupled in parallel. As in the case described with reference to FIG. 7, first synchronization pattern correlator 710 receives the real component of the signal as an in-phase ("I") input. Second synchronization pattern correlator 720 receives the imaginary component of the signal as a quadrature ("Q") input. Also as previously described, first low pass filter 735 and second low pass filter 740 provide their respective average steady state values of Is and Qs. Multiplier 745 provides the first product (Is) (I) and multiplier 765 provides the second product (Qs) (Q). Subtraction circuit 770 subtracts the second product, (Qs) (Q), from the first product, (Is) (I), to form a subtraction result that is equal to ((Is)(I)–(Qs)(Q)).

In this embodiment, however, a third synchronization pattern correlator 810 receives the output signal, I", and correlates the output signal, I", with each of a plurality of data segment synchronization patterns. Latency compensation delay circuit 820 adds a time delay to the synchronization timing window signal to compensate for the time used to obtain the signal ((Is) (I)–(Qs) (Q)).

Third low pass filter 830 is coupled to third synchronization pattern correlator 810. Third low pass filter 830 averages the results of the plurality of correlations to obtain an average correlated value of amplitude. Comparator circuit 840 receives the average correlated value of amplitude from third low pass filter 830 and compares it with a reference amplitude.

Comparator circuit 840 sends the negative difference between the average correlated value of amplitude and the reference amplitude to integrator circuit 850. Integrator circuit 850 integrates the negative difference between the average correlated value of amplitude and the reference amplitude and provides the integration result to multiplier circuit 785.

Multiplier circuit 785 receives the subtraction result of ((Is) (I)–(Qs)(Q)) from subtraction circuit 770 and the integration result from integration circuit 850 and multiplies the two results to obtain the output signal, I'.

The present invention enables a VSB-modulated digital data signal to be demodulated in the presence of severe pilot carrier phase rotation without using a complex channel equalizer. The present invention may also be efficiently implemented on an integrated circuit.

Although the present invention has been described in detail, those skilled in the art should understand that they can make various changes, substitutions and alterations herein without departing from the spirit and scope of the invention in its broadest form.

What is claimed is:

1. A system, for use in a receiver capable of receiving a complex signal, for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said first synchronization pattern detector and said second synchronization pattern detector send coordination signals to each other to insure that the data segment synchronization pattern detected by said first synchronization pattern detector has the same symbol positions as the data segment synchronization pattern detected by said second synchronization pattern detector.

2. A system, for use in a receiver capable of receiving a complex signal, for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said first synchronization pattern detector detects a data segment synchronization pattern comprising the symbols 1001 when the polarity of a data symbol stream in said complex signal is positive, and detects a complementary data segment synchronization pattern comprising the symbols 0110 when the polarity of a data symbol stream in said complex signal is negative, and wherein said first synchronization pattern detector comprises:

a count memory containing a plurality of count values for recording the detection of a data segment synchronization pattern wherein at least one of said plurality of count values in said count memory is:

incremented when a data segment synchronization pattern comprising the symbols 1001 is detected;

decremented when a data segment synchronization pattern comprising the symbols 0110 is detected; and decremented towards zero when neither data synchronization pattern 1001 nor data synchronization pattern 0110 is detected.

3. A system, for use in a receiver capable of receiving a complex signal, for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said second synchronization pattern detector detects a data segment synchronization pattern comprising the symbols 1001 when the polarity of a data symbol stream in said complex signal is positive, and detects a complementary data segment synchronization pattern comprising the symbols 0110 when the polarity of a data symbol stream in said complex signal is negative, and wherein said second synchronization pattern detector comprises:

a count memory containing a plurality of count values for recording the detection of a data segment synchronization pattern wherein at least one of said plurality of count values in said count memory is:

incremented when a data segment synchronization pattern comprising the symbols 1001 is detected;

decremented when a data segment synchronization pattern comprising the symbols 0110 is detected; and decremented towards zero when neither data synchronization pattern 1001 nor data synchronization pattern 0110 is detected.

4. A system, for use in a receiver capable of receiving a complex signal, for compensating for a phase rotation of said complex signal, said system comprising:

a first synchronization pattern detector for identifying a data segment synchronization pattern in a real component of said complex signal, said first synchronization pattern detector identifying the polarity of said real component, and compensating said real component for said polarity of said real component of said complex signal;

a second synchronization pattern detector, coupled in parallel with said first synchronization pattern detector, for identifying said data segment synchronization pattern in an imaginary component of said complex signal, said second synchronization pattern detector identifying the polarity of said imaginary component, and compensating said imaginary component for said polarity of said imaginary component of said complex signal;

an adder circuit for adding said polarity-compensated real component and said polarity compensated imaginary component; and a multiplier circuit for multiplying the sum of said polarity-compensated real component and said polarity-compensated imaginary component by a numerical constant.

5. A system, for use in a receiver capable of receiving a complex signal, for compensating for a phase rotation of said complex signal, said system comprising:

a first synchronization pattern correlator for identifying a data segment synchronization pattern in a real component of said complex signal;

a first low-pass filter, coupled to said first synchronization pattern correlator, for determining a steady state amplitude, Is, of the real component, I, of said complex signal;

a second synchronization pattern correlator, coupled in parallel with said first synchronization pattern correlator, for identifying said data segment synchronization pattern in an imaginary component of said complex signal;

a second low-pass filter, coupled to said second synchronization pattern correlator, for determining a steady state amplitude, Qs, of the imaginary component, Q, of said complex signal;

a first multiplier circuit for multiplying said steady state amplitude of said real component, Is, by an amplitude of said real component, I, to form a first product;

a second multiplier circuit for multiplying said steady state amplitude of said imaginary component, Qs, by an amplitude of said imaginary component, Q, to form a second product;

a subtraction circuit for subtracting said second product from said first product to form a subtraction result; and a multiplier circuit for multiplying said subtraction result by an amplitude factor K, and for dividing the product of said subtraction result and said amplitude factor K by an amplitude factor equal to the sum of Is squared and Qs squared.

6. A system, for use in a receiver capable of receiving a complex signal, for compensating for a phase rotation of said complex signal, said system comprising:

a first synchronization pattern correlator for identifying a data segment synchronization pattern in a real component of said complex signal;

a first low-pass filter, coupled to said first synchronization pattern correlator, for determining a steady state amplitude, Is, of the real component, I, of said complex signal;

a second synchronization pattern correlator, coupled in parallel with said first synchronization pattern correlator, for identifying said data segment synchronization pattern in an imaginary component of said complex signal;

a second low-pass filter, coupled to said second synchronization pattern correlator, for determining a steady state amplitude, Qs, of the imaginary component, Q, of said complex signal;

a first multiplier circuit for multiplying said steady state amplitude of said real component, Is, by an amplitude of said real component, I, to form a first product;

a second multiplier circuit for multiplying said steady state amplitude of said imaginary component, Qs, by an amplitude of said imaginary component, Q, to form a second product;

a subtraction circuit for subtracting said second product from said first product to form a subtraction result;

a third synchronization pattern correlator for receiving an output signal, I", and for correlating said output signal with each of a plurality of data segment synchronization patterns;

a third low-pass filter, coupled to said third synchronization pattern correlator, for averaging the results of said plurality of correlations to obtain an average correlated value of amplitude;

a comparator circuit, coupled to said third low-pass filter, for comparing said average correlated value of amplitude with a reference amplitude;

an integrator circuit, coupled to said comparator circuit, for integrating the negative difference between the average correlated value of amplitude and said reference amplitude; and a third multiplier circuit, coupled to said integrator circuit and to said subtraction circuit, for multiplying said subtraction result by the output of said integrator circuit to produce said output signal, I".

7. A television receiver capable of receiving a complex signal, said television receiver having a system for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said first synchronization pattern detector and said second synchronization pattern detector send coordination signals to each other to insure that the data segment synchronization pattern detected by said first synchronization pattern detector has the same symbol positions as the data segment synchronization pattern detected by said second synchronization pattern detector.

8. A television receiver capable of receiving a complex signal, said television receiver having a system for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said first synchronization pattern detector detects a data segment synchronization pattern comprising the symbols 1001 when the polarity of a data symbol stream in said complex signal is positive, and detects a complementary data segment synchronization pattern comprising the symbols 0110 when the polarity of a data symbol stream in said complex signal is negative, and wherein said first synchronization pattern detector comprises:

a count memory containing a plurality of count values for recording the detection of a data segment synchronization pattern, wherein at least one of said plurality of count values in said count memory is:

incremented when a data segment synchronization pattern comprising the symbols 1001 is detected;

decremented when a data segment synchronization pattern comprising the symbols 0110 is detected; and decremented towards zero when neither data synchronization pattern 1001 nor data synchronization pattern 0110 is detected.

9. A television receiver capable of receiving a complex signal, said television receiver having a system for recovering a data segment synchronization pattern within said complex signal, said system comprising:

a first synchronization pattern detector for receiving a real component of said complex signal, and for detecting said data segment synchronization pattern on said real component of said complex signal; and a second synchronization pattern detector, coupled in parallel with said first synchronization pattern detector, for receiving an imaginary component of said complex signal, and for detecting said data segment synchronization pattern on said imaginary component of said complex signal, wherein said second synchronization pattern detector detects a data segment synchronization pattern comprising the symbols 1001 when the polarity of a data symbol stream in said complex signal is positive, and detects a complementary data segment synchronization pattern comprising the symbols 0110 when the polarity of a data symbol stream in said complex signal is negative, and wherein said second synchronization pattern detector comprises:
a count memory containing a plurality of count values for recording the detection of a data segment synchronization pattern,
wherein at least one of said plurality of count values in said count memory is:
incremented when a data segment synchronization pattern comprising the symbols 1001 is detected;
decremented when a data segment synchronization pattern comprising the symbols 0110 is detected; and
decremented towards zero when neither data synchronization pattern 1001 nor data synchronization pattern 0110 is detected.

10. A television receiver capable of receiving a complex, said television receiver having a system for compensating for a phase rotation of said complex signal, said system comprising:
a first synchronization pattern detector for identifying a data segment synchronization pattern in a real component of said complex signal, said first synchronization pattern detector identifying the polarity of said real component, and compensating said real component for said polarity of said real component of said complex signal;
a second synchronization pattern detector, coupled in parallel with said first synchronization pattern detector, for identifying said data segment synchronization pattern in an imaginary component of said complex signal, said second synchronization pattern detector identifying the polarity of said imaginary component, and compensating said imaginary component for said polarity of said imaginary component of said complex signal;
an adder circuit for adding said polarity-compensated real component and said polarity-compensated imaginary component; and
a multiplier circuit for multiplying the sum of said polarity-compensated real component and said polarity-compensated imaginary component by a numerical constant.

11. A television receiver capable of receiving a complex signal, said television receiver having a system for compensating f or a phase rotation of said complex signal, said system comprising:
a first synchronization pattern correlator identifying a data segment synchronization pattern in a real component of said complex signal;
a first low-pass filter, coupled to said first synchronization pattern correlator, for determining a steady state amplitude, Is, of the real component, I, of said complex signal;
a second synchronization pattern correlator, coupled in parallel with said first synchronization pattern correlator, for identifying said data segment synchronization pattern in an imaginary component of said complex signal;
a second low-pass filter, coupled to said second synchronization pattern correlator, for determining a steady state amplitude, Qs, of the imaginary component, Q, of said complex signal;
a first multiplier circuit for multiplying said steady state amplitude of said real component, Is, by an amplitude of said real component, I, to form a first product;
a second multiplier circuit for multiplying said steady state amplitude of said imaginary component, Qs, by an amplitude of said imaginary component, Q, to form a second product;
a subtraction circuit for subtracting said second product from said first product to form a subtraction result; and
a multiplier circuit for multiplying said subtraction result by an amplitude factor K, and for dividing the product of said subtraction result and said amplitude factor K by an amplitude factor equal to the sum of Is squared and Qs squared.

12. A television receiver capable of receiving a complex signal, said television receiver having a system for compensating for a phase rotation of said complex signal, said system comprising:
a first synchronization pattern correlator for identifying a data segment synchronization pattern in a real component of said complex signal;
a first low-pass filter, coupled to said first synchronization pattern correlator, for determining a steady state amplitude, Is, of the real component, I, of said complex signal;
a second synchronization pattern correlator, coupled in parallel with said first synchronization pattern correlator, for identifying said data segment synchronization pattern in an imaginary component of said complex signal;
a second low-pass filter, coupled to said second synchronization pattern correlator, for determining a steady state amplitude, Qs, of the imaginary component, Q, of said complex signal;
a first multiplier circuit for multiplying said steady state amplitude of said real component, Is, by an amplitude of said real component, I, to form a first product;
a second multiplier circuit for multiplying said steady state amplitude of said imaginary component, Qs, by an amplitude of said imaginary component, Q, to form a second product;
a subtraction circuit for subtracting said second product from said first product to form a subtraction result;
a third synchronization pattern correlator for receiving an output signal, I", and for correlating said output signal with each of a plurality of data segment synchronization patterns;
a third low-pass filter, coupled to said third synchronization pattern correlator, for averaging the results of said plurality of correlations to obtain an average correlated value of amplitude;
a comparator circuit, coupled to said third low-pass filter, for comparing said average correlated value of amplitude with a reference amplitude;
an integrator circuit, coupled to said comparator circuit, for integrating the negative difference between the average correlated value of amplitude and said reference amplitude; and
a third multiplier circuit, coupled to said integrator circuit and to said subtraction circuit, for multiplying said subtraction result by the output of said integrator circuit to produce said output signal, I".

13. A method of recovering a data segment synchronization pattern within a complex signal, said method comprising the steps of:
receiving a real component of said complex signal within a first synchronization pattern detector;
detecting said data segment synchronization pattern on said real component of said complex signal;

receiving an imaginary component of said complex signal within a second synchronization pattern detector; and detecting said data segment synchronization pattern on said imaginary component of said complex signal, wherein the method further comprises the step of:

sending coordination signals from said first synchronization pattern detector to said second synchronization pattern detector and from said second synchronization pattern detector to said first synchronization pattern detector to insure that the data segment synchronization pattern detected by said first synchronization pattern detector has the same symbol positions as the data segment synchronization pattern detected by said second synchronization pattern detector.

14. A method of compensating for a pilot carrier phase rotation, the method comprising the steps of:

identifying, with a first synchronization pattern detector, a data segment synchronization pattern in a real component of said complex signal;

identifying the polarity of said real component of said complex signal; and compensating said real component for said polarity of said real component of said complex signal, the steps of:

identifying, with a second synchronization pattern detector, a data segment synchronization pattern in an imaginary component of said complex signal;

identifying the polarity of said imaginary component of said complex signal;

compensating said imaginary component for said polarity of said imaginary component of said complex signal;

adding said polarity-compensated real component and said polarity-compensated imaginary component; and multiplying the sum of said polarity-compensated real component and said polarity-compensated imaginary component by a numerical constant.

* * * * *